United States Patent
Smith

(10) Patent No.: US 11,018,937 B2
(45) Date of Patent: May 25, 2021

(54) DETERMINING AN EFFECT OF A NETWORK CONFIGURATION CHANGE

(71) Applicant: Cisco Technology, Inc., San Jose, CA (US)

(72) Inventor: Rodney Bruce Smith, Fremont, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 74 days.

(21) Appl. No.: 16/040,389

(22) Filed: Jul. 19, 2018

(65) Prior Publication Data

US 2019/0036776 A1 Jan. 31, 2019

Related U.S. Application Data

(60) Provisional application No. 62/539,502, filed on Jul. 31, 2017.

(51) Int. Cl.
*H04L 12/24* (2006.01)
*H04L 12/715* (2013.01)

(52) U.S. Cl.
CPC ...... *H04L 41/0866* (2013.01); *H04L 41/0813* (2013.01); *H04L 41/0883* (2013.01); *H04L 41/145* (2013.01); *H04L 41/28* (2013.01); *H04L 41/5019* (2013.01); *H04L 45/64* (2013.01)

(58) Field of Classification Search
None
See application file for complete search history.

(56) References Cited

U.S. PATENT DOCUMENTS

| | | | |
|---|---|---|---|
| 9,184,929 B2* | 11/2015 | Cruickshank, III | H04L 43/067 |
| 9,276,877 B1* | 3/2016 | Chua | H04L 45/38 |
| 10,268,709 B1* | 4/2019 | Suehs | G06F 16/211 |
| 10,440,082 B1* | 10/2019 | Winston | H04N 21/2387 |
| 10,757,630 B2* | 8/2020 | Leroux | H04L 41/147 |
| 2009/0055901 A1* | 2/2009 | Kumar | G06F 21/604 726/4 |
| 2011/0082596 A1* | 4/2011 | Meagher | H02J 13/00001 700/291 |
| 2015/0029865 A1* | 1/2015 | Drobinsky | H04L 67/322 370/238 |
| 2015/0244607 A1* | 8/2015 | Han | H04L 45/64 370/254 |
| 2016/0150460 A1* | 5/2016 | Leroux | H04W 24/08 370/329 |
| 2016/0218933 A1* | 7/2016 | Porras | H04L 63/20 |

(Continued)

FOREIGN PATENT DOCUMENTS

EP 3119052 A1 * 1/2017 ............. H04L 45/38

*Primary Examiner* — Dhairya A Patel
(74) *Attorney, Agent, or Firm* — Polsinelli PC

(57) ABSTRACT

A method may include identifying a first set of values indicative of a present state of a software-defined network (SDN). The method may further include receiving one or more proposed changes to the SDN via an interface. The method may also include determining, based on the one or more proposed changes to the SDN, a potential state of the SDN and a second set of values indicative of the potential state of the SDN. The method may further include generating a change index based on a comparison of the first set of values with the second set of values. The method may also include providing the change index via the interface.

20 Claims, 4 Drawing Sheets

(56) References Cited

U.S. PATENT DOCUMENTS

| | | | |
|---|---|---|---|
| 2016/0371701 A1* | 12/2016 | Mirza | G06Q 30/016 |
| 2017/0230267 A1* | 8/2017 | Armolavicius | H04L 41/20 |
| 2018/0013579 A1* | 1/2018 | Fairweather | H04L 12/40032 |
| 2018/0013642 A1* | 1/2018 | Plaza | H04L 41/0893 |
| 2018/0026834 A1* | 1/2018 | Dec | H04L 41/145 709/221 |
| 2018/0131578 A1* | 5/2018 | Cui | H04L 49/70 |
| 2018/0307909 A1* | 10/2018 | O'Brien | G06F 3/0426 |
| 2019/0215246 A1* | 7/2019 | Kawalay | H04L 41/147 |

* cited by examiner

DETERMINING AN EFFECT OF A NETWORK CONFIGURATION CHANGE

CROSS REFERENCE TO RELATED APPLICATIONS

This application claims priority to U.S. Patent App. No. 62/539,502, filed on Jul. 31, 2017, which is hereby incorporated by reference in its entirety.

FIELD

The embodiments discussed in the present disclosure are related to determining an effect of a network configuration change.

BACKGROUND

The use of networks is a useful tool in allowing communication between distinct computing devices. Despite the proliferation of computers and networks over which computers communicate, there still remains various limitations to current network technologies.

The subject matter claimed in the present disclosure is not limited to embodiments that solve any disadvantages or that operate only in environments such as those described above. Rather, this background is only provided to illustrate one example technology area where some embodiments described in the present disclosure may be practiced.

SUMMARY

One or more embodiments of the present disclosure may include a method that may include identifying a first set of values indicative of a present state of a software-defined network (SDN). The method may further include receiving one or more proposed changes to the SDN via an interface. The method may also include determining, based on the one or more proposed changes to the SDN, a potential state of the SDN and a second set of values indicative of the potential state of the SDN. The method may further include generating a change index based on a comparison of the first set of values with the second set of values. The method may also include providing the change index via the interface.

One or more embodiments of the present disclosure may additionally include systems and/or non-transitory computer readable media for facilitating the performance of such methods.

The object and advantages of the embodiments will be realized and achieved at least by the elements, features, and combinations particularly pointed out in the claims.

It is to be understood that both the foregoing general description and the following detailed description are merely examples and explanatory and are not restrictive of the invention, as claimed.

BRIEF DESCRIPTION OF THE DRAWINGS

Example embodiments will be described and explained with additional specificity and detail through the use of the accompanying drawings in which.

DESCRIPTION OF EMBODIMENTS

Figure 1:
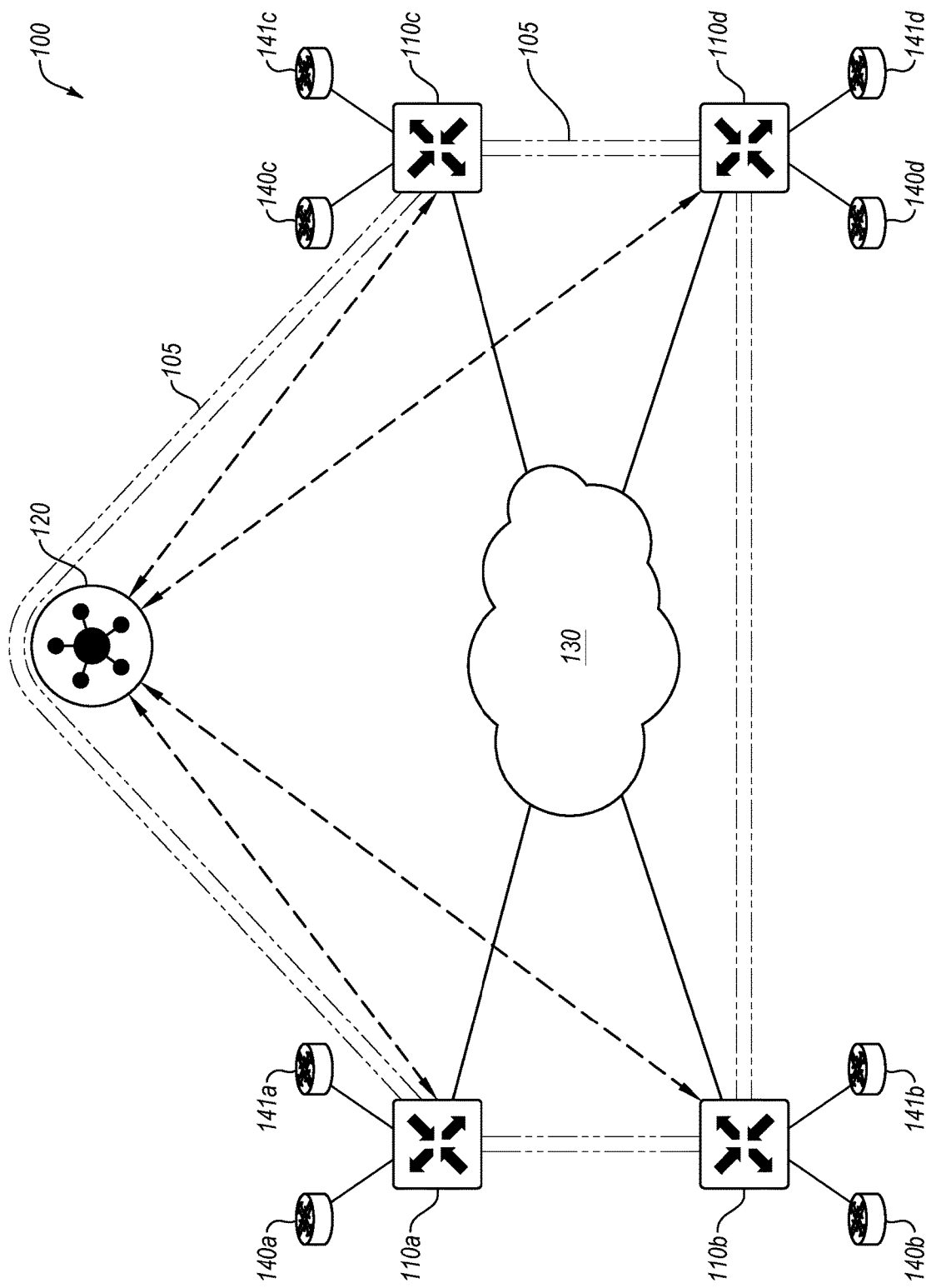
FIG. 1 illustrates an example system of network components implementing a software-defined network (SDN)

Some embodiments of the present disclosure relate to improvements to the operation of software-defined networks (SDN) and implementing proposed changes in a SDN. In a SDN, a network control plane may be functionally separated from physical topology and a data plane, unlike conventional networking. For example, the SDN may include one or more virtualized components, such as a router that is run on a virtual machine, a hypervisor, or a cloud-based server.

Over the control plane, a control device may monitor the SDN and path characteristics of the data plane tunnels between devices (e.g., routers). The control device may use this information to identify values associated with the present state of the SDN and to identify values associated with a potential state of the SDN based on proposed changes to the SDN. By comparing values associated with the present state of the SDN with values associated with the potential state of the SDN after implementing the proposed changes, the control device may determine a change index of the magnitude of the proposed changes. The change index may allow network engineers and administrators to better understand the consequences of any actions they take with regards to the setup and functioning of the SDN.

As an example, a first administrator account may be used to input proposed changes to a SDN via an interface. A control device may determine a potential state of the SDN based on the proposed changes. The control device may determine a change index based on values indicative of the present state of the SDN and values indicative of the potential state of the SDN. The change index may exceed a change threshold associated with the first administrator account. In some embodiments, in response to the change index exceeding the change threshold, the control device 120 may present a warning that change index exceeds the change threshold. The control device 120 may present the change index and details concerning the change index. For example, the control device 120 may present the change index on a display. In these and other embodiments, in response to receiving an authorization from the first administrator account to override the warning, the control device may allow the proposed changes to be implemented in the SDN.

Alternatively or additionally, in some embodiments, in response to the change index exceeding the change threshold, the control device 120 may prevent the proposed changes from being implemented in the SDN. The first administrator may view the change index and may view the differences that are incorporated into the change index. The first administrator may request authorization from a second administrator associated with a second administrator account with a higher change threshold. The second administrator account may provide authorization to implement the changes in the SDN. In response to receiving the authorization to implement the changes from the second administrator account with a permission level with a change threshold greater than or equal to the change index, the control device 120 may allow the proposed changes to be implemented in the SDN.

One or more embodiments of the present disclosure may include solutions to technology-based problems associated with software-defined networking. Embodiments of the present disclosure may provide improvements to computer networks and to the operation of computers themselves. For example, using one or more embodiments of the present disclosure, network administrators may be able to make modifications to networks more quickly and with a reduction in network outages or losses of functionality of network resources. Additionally, network engineers and administrators may have increased information about the magnitude of the changes they are trying to implement in a network before the changes are actually implemented in the network. As another example, a network administrator may be unable to implement a change in the network based on a permission level of the network administrator and/or a magnitude of the proposed change. As an additional example, a network engineer may examine the effects of the proposed changes to the network categorically, for example by values associated with the present state of the network, which may allow the network engineer to determine which parts of the network may experience alterations in functionality based on the proposed changes.

Embodiments of the present disclosure are explained with reference to the accompanying drawings.

FIG. 1 illustrates an example system 100 of network components implementing a software-defined network (SDN), in accordance with one or more embodiments of the present disclosure. The SDN may include any type of network or network topology. For example, the SDN may include a software-defined wide area network (SD-WAN), software-defined local area network (LAN), software-defined metropolitan area network (MAN), or any other type of network. The system 100 may include an internal network domain 105 and one or more external network domains. The system 100 may include one or more edge network devices 110 (such as the edge network devices 110a-110d), a control device 120, a communication network 130, and external network devices 140 and 141 (such as the external network devices 140a-140d and 141a-141d).

For ease and clarity in explanation, some examples of the present disclosure are described with respect to a WAN where the network is managed at least partially by software rather than controlled by hardware. As such, the SDN may support multiple types of connections or communication links, such as the Internet, MultiProtocol Label Switching (MPLS) connections, and/or cellular connections (such as Long Term Evolution (LTE), LTE Advanced, Worldwide Interoperability for Microwave Access (WiMAX), Evolved High Speed Packet Access (HSPA+), and/or others). Additionally, the SDN may support load balancing or load sharing between the various connections. Further, because of the distributed nature of some networks, the SDN may support virtual private networks (VPNs), firewalls, and other security services. In an SD-WAN, for example, a control plane may be functionally separated from the physical topology. In some embodiments, the SDN may separate the control plane of the network (to be managed via software) from a data plane of the network (operating on the hardware of the network). As used herein, the term control plane may refer to communications and connections used in the control and administration of a network itself, rather than the transmission of data through the network, which may occur at the data plane. The control plane may be used in conjunction with the collection of data from various components in the SDN. As used herein, the term data plane may refer to communications and connections used in the transmission and reception of data through the network. For example, the control plane may include administrative traffic directed to a network device within a network, while the data plane may include traffic that passes through network devices within the network. The control plane may be used to exchange data between the control device 120 and various components in the SDN separately than traffic on the data plane. In at least one embodiment, data on the control plane may be isolated from traffic on the data plane. The isolation may be physical isolation (e.g., in different physical hardware and wires), or logical (e.g., isolated in the internal network domain 105 via software). Isolation of the data on the control plane from traffic on the data plane may provide increased security for one or both of the data on the control plane and the traffic on the data plane. Data on the control plane may be exchanged between the control device 120 and various components in the SDN at or near real-time.

In some embodiments, the control device 120 may be configured to manage the control plane of an internal network domain 105 by directing one or more aspects of the operation of the edge network devices 110. The control device 120 may direct data collection activities at various components of the SDN. For example, the control device 120 may direct one or more of the edge network devices 110 to monitor various characteristics of the SDN, such as performance, SLA, security, etc. Monitored data include data associated with the monitored characteristics. The monitored data may include bandwidth data, usage data, carrier data, geography data, user data, application data, site data, loss, latency, jitter, cost data, among other data. In some embodiments, the monitored data may include route data, port ranges, a number of transport links per device, a number of network connections per device, a tunnel configuration or topology of the SDN (for example, a hub and spoke configuration or a full mesh configuration), a number of hosts of the SDN, applications used over the SDN, and autonomous systems associated with the SDN. The control device 120 may use one or more control messages to direct the data collection activities at the various components of the SDN. For example, the control device 120 may generate a set of instructions for a set of devices in the SDN to monitor a set of characteristics. The control device 120 may send the set of instructions as a control message to the set of devices in the SDN via the control plane.

In some embodiments, the control device 120 may direct data collection of values indicative of the present state of the SDN. For example, the values may include routes in the SDN. The routes in the present state of the SDN may include a single subnet, multiple subnets, or the entire internet. The values may include port ranges through which network traffic may flow. For example, in the present state of the SDN, the TCP 80 port may be available for traffic. Alternatively, in some embodiments, TCP 80 and UDP 16000-32000 may be available for traffic. In some embodiments, different ports may be associated with different applications, uses, or types of traffic. For example, TCP 80 may be associated with Hypertext Transfer Protocol (HTTP) traffic for web browsing. Other ports may be associated with particular applications such as internet calling, internet video, internet gaming, backup utilities, or productivity applications.

The values may also include the number of transport links or network connections per device in the SDN. For example, in the present state of the SDN, each device may be associated with one network connection. Alternatively or additionally, each device may be associated with two network connections, five network connections, ten network connections, or any other number of network connections. The values may also include a tunnel configuration of the SDN. For example, the network may be arranged in a hub and spoke configuration. In the hub and spoke configuration, tunnels or encrypted routes may connect edge network devices 110 to a centralized device. In these and other embodiments, encrypted data may be routed from one edge network device 110 to another edge network device 110 through the "hub" of the configuration. Alternatively, the SDN may be in a mesh configuration. In the mesh configuration, tunnels may connect each edge network device 110 to each other edge network device 110. In these and other embodiments, encrypted data may be routed from one edge network device 110 directly to another edge network device 110 without first traveling through a hub. In some embodiments, the SDN may be in a configuration between hub and spoke and mesh. In these and other embodiments, some edge network device 110 may be connected to each other with tunnels and other edge network devices 110 may be connected to the hub with tunnels.

In some embodiments, the values may also include a number of hosts in the SDN. In these and other embodiments, a host may include a computer or other device connected to the SDN. In some embodiments, the control device 120 may determine the number of hosts using a network flow monitoring table. For example, a network flow monitoring table may include information associated with a source IP address, a destination IP address, a source port, a destination port, and other information associated with the information flow. In some embodiments, the values may also include a number of autonomous systems in the SDN. In these and other embodiments, an autonomous system may include a group of IP routing prefixes operated under the supervision or control of a single administrative entity. For example, the administrative entity may include a company, an educational entity, a group of corporations, or other group. For example, in these and other embodiments, the network may include one autonomous system. Alternatively or additionally, in some embodiments, the network may include the entire internet or multiple autonomous systems.

In some embodiments, the values may also include other information indicative of the present state of the SDN. For example, the values may include the number of nodes in the SDN, the number of routes in the SDN, the number of reachable destinations in the SDN, the number of WAN interfaces per node, the number of LAN interfaces per node, network services inserted, bandwidth, and other components that provide reachability or affect how traffic is routed.

In some embodiments, the control device 120 may also direct data collection of historical data of the SDN. For example, in some embodiments, the historical data may include which applications are most used by the edge network devices 110 of the SDN. For example, in some embodiments, high-use applications may include a trading floor application or other applications frequently accessed by edge network devices 110 of the SDN. Alternatively, low priority applications may include social media applications, entertainment applications, or other applications unrelated to the purpose of the SDN. For example, in a workplace SDN, entertainment applications may be considered low priority. Alternatively, in a home network, entertainment applications may be considered higher priority.

In some embodiments, the control device 120 may maintain a central route table that stores route information within the internal network domain 105. For example, the control device 120 may communicate with various edge network devices 110 to determine the physical and/or logical connections available to the edge network devices 110 through the communication network 130. In some embodiments, the edge network devices 110 may include one or more physical and/or logical connections to each other. In these and other embodiments, the control device 120 may generate and/or update one or more policies in conjunction with the monitor data and/or the central route table to help the edge network devices 110 to determine data traffic routes through the internal network domain 105. For example, the control device 120 may provide policies and other configuration preferences related to traffic flows to the edge network devices 110 rather than being involved with every individual flow through the internal network domain 105.

In these and other embodiments, the edge network devices 110 may not have stored the topology and/or route paths of the entire system 100. Each of the edge network devices 110 may not need to query each other individually to determine reachability. Instead, the control device 120 may provide such information to the edge network devices 110. In these and other embodiments, the edge network devices 110 may route traffic through a most direct route, a most cost effective route, a most reliable route, or through some other route based on one or more other policies received from of the control device 120, characteristics of the traffic, characteristics of the route path, a source edge network device 110, and a destination (e.g., edge network device 110).

According to the set of instructions in the control message, the set of devices in the SDN may collect the monitor data. The devices in the system may send the monitor data securely over a data-bus in real-time to the control device 120. As an example, with QoS monitoring of communication links, the edge network devices 110 may provide for one or more QoS metrics that may be monitored for any communication link, such as jitter, bandwidth, error rate, bit rate, throughput, and/or others. The various components of the SDN may send monitored data to the control device 120 via the control plane.

The internal network domain 105 may operate as a secured and controlled domain with specific functionality and/or protocols. In some embodiments, the edge network devices 110 may operate based on one or more policies created and/or propagated by the control device 120. In these and other embodiments, the edge network devices 110 may route data traffic within the internal network domain 105 based on the policies created and/or propagated by the control device 120.

The edge network devices 110 may operate at a boundary of the internal network domain 105. The edge network devices 110 may include one or more physical and/or logical connections that may operate within the internal network domain 105. Such connections may be illustrated as part of the communication network 130. Additionally or alternatively, the edge network devices 110 may include one or more physical and/or logical connections operating outside of the internal network domain 105. For example, the edge network devices 110 may be connected to the external network device(s) 140 and/or 141.

In some embodiments, the edge network devices 110 may operate to route traffic from associated external network devices 140 and 141 into the internal network domain 105. Additionally or alternatively, the edge network devices 110 may operate to route traffic from the internal network domain 105 to the associated external network devices 140 and 141. In some embodiments, the edge network devices 110 may communicate with associated external network devices 140 and 141 using typical communication protocols, such as Open Shortest Path First (OSPF), Border Gateway Protocol (BGP), Virtual Router Redundancy Protocol (VRRP), Bi-directional Forwarding Detection (BFD), among others. Additionally or alternatively, the edge network devices 110 may support other network functionalities such as differentiated services code point (DSCP) tagging or type of service (TOS) tagging, Quality of Service (QoS) monitoring, Service Level Agreements (SLA), Internet Protocol (IP) forwarding, Internet Protocol Security (IPsec), Access Control Lists (ACL), among others.

For example, with DSCP or TOS tagging, the edge network devices 110 may be configured to insert a DSCP or TOS tag into a packet header. Such a DSCP or TOS tag may identify one (or a preferences for one) communication link of multiple communication links on which to send certain types of network traffic. Based on the DSCP or TOS tag, the edge network devices 110 may route the network traffic via one or more types of communication link.

As another example, with IP forwarding, the edge network devices 110 may include one or more policies to route packets via a particular type of communication link in an IP network. For example, such a policy may take into account factors such as packet size, services specified by a header, characteristics of potential links to other routers in the network, and/or others. Using such factors, the edge network devices 110 may forward packets based on a selected algorithm, such as a shortest path.

As an additional example, with IPsec, the edge network devices 110 may use IPsec to authenticate and/or encrypt network traffic. For example, a given edge network device 110 may authenticate one or more computing devices to communicate with the given edge network device 110 and/or encrypt one or more packets communicated between the computing device and the given edge network device 110.

As another example, with ACLs, the edge network devices 110 may include a set of rules indicative of one or more addresses, hosts, and/or networks that may be permitted to use a given port or a particular communication link. In these and other embodiments, the edge network devices 110 may include ACLs that are applicable to inbound traffic, outbound traffic, or both.

In some embodiments, the edge network devices 110 may locally maintain one or more route tables. In some embodiments, the edge network devices 110 may adjust or modify the route tables based on one or more policies sent from the control device 120. For example, one or more entries may be removed, discarded, or otherwise not added to the route tables by the edge network devices 110 based on the one or more policies. In some embodiments, the edge network devices 110 may include logic to update, modify, and/or generate the route tables based on policies from the control device 120 and/or from traffic handled by the edge network devices 110. The one or more route tables may be automatically populated by the edge network devices 110 based on direct interface routes, static routes, and/or dynamic routes learned using one or more network protocols such as BGP and/or OSPF. In some embodiments, routing decisions for data outside of the internal network domain 105 may be performed by a particular edge network device 110 without specific direction, input, or control from the control device 120. For example, the particular edge network device 110 may compute a routing decision based on the one or more policies that the particular edge network device 110 has received from the control device 120.

In some embodiments, one or more of the edge network devices 110 and/or the control device 120 may be implemented as one or more virtual machines operating on one or more physical computing devices. Additionally or alternatively, the edge network devices 110 and/or the control device 120 may each include an individual stand-alone computing device.

In some embodiments, the control device 120 may receive one or more proposed changes to the SDN from a network engineer or an administrator of the SDN via an interface. The interface may include one or more user interfaces, one or more hardware interfaces, one or more software interfaces, and/or one or more peripheral devices. For example, in some embodiments, the control device 120 may receive the one or more proposed changes as an input signal (e.g., input from a system administrator, a software-based trigger) from a peripheral device such as a mouse, via a software interface from a software application, from a user interface via a touchscreen input, or from other hardware and/or software components. In some embodiments, the one or more proposed changes may include additional programming, added lines of code, changed lines of code, or removed lines of code from source code associated with the functioning of the SDN. Alternatively or additionally, in some embodiments, the proposed changes may include changes to one or more whitelists in the SDN. In these and other embodiments, a whitelist may include a list of entities, applications, sites, programs, MAC addresses, IP addresses, and/or users with particular privileges, network access, device access, or host access. In some embodiments, the one or more proposed changes may have multiple effects on the functioning of the SDN after the proposed changes are implemented in the system.

In some embodiments, the control device 120 may generate a change index based on the one or more proposed changes. In these and other embodiments, the control device 120 may determine a potential state of the SDN based on the proposed changes. For example, the proposed changes may include changes to routing in the SDN, changes to the number of hosts in the SDN, changes to the access to external networks such as the Internet, and/or other changes in the functioning of the SDN. For example, the control device 120 may be configured to determine that the proposed changes would alter the port ranges available to edge network devices 110 of the SDN. For example, the present state of the SDN may include access to TCP 80. However, the proposed changes may result in access to TCP 80 and UDP 16000-32000. Similarly, the proposed changes may impact any number of nodes from 0 nodes to every node in the SDN.

As described above, the control device 120 may direct data collection of one or more values indicative of the present state of the SDN. In some embodiments, the values indicative of the present state of the SDN may include route data, port ranges, a number of transport links per device, a number of network connections per device, a tunnel configuration or topology of the SDN, a number of hosts of the SDN, applications used over the SDN, autonomous systems associated with the SDN, a number of nodes in the SDN, a number of reachable destinations in the SDN, a number of WAN interfaces per node, a number of LAN interfaces per node, bandwidth, and other values indicative of the present state of the SDN.

The control device 120 may also be configured to determine values indicative of the potential state of the SDN based on the proposed changes. The values indicative of the potential state of the SDN may include values corresponding to values indicative of the present state of the SDN. For example, in some embodiments, the control device 120 may determine route data, port ranges, a number of transport links per device, a number of network connections per device, a tunnel configuration or topology of the potential state of the SDN, a number of hosts of the potential state of the SDN, autonomous systems associated with the potential state of the SDN, a number of nodes in the SDN, a number of reachable destinations in the SDN, a number of WAN interfaces per node, a number of LAN interfaces per node, bandwidth, and other values indicative of the potential state of the SDN. For example, the control device 120 may identify route data for the present state of the SDN and may also determine route data for the potential state of the SDN. Similarly, the control device 120 may identify other values indicative of the present state of the SDN and determine values indicative of the potential state of the SDN corresponding to the values indicative of the present state of the SDN.

In some embodiments, the control device 120 may be configured to compare the present state of the SDN with the potential state of the SDN. In these and other embodiments, the control device 120 may compare the present state with the potential state by comparing the values indicative of the present state with the values indicative of the potential state. For example, one value indicative of the present state of the SDN may include the port ranges available for traffic in the present state of the SDN. A corresponding value indicative of the potential state of the SDN may include port ranges available for traffic in the potential state of the SDN. In these and other embodiments, the value indicative of the present state may be port TCP 80 and the value indicative of the potential state may be ports TCP 80 and UDP 16000-32000. By comparing the corresponding port ranges available values, one difference between the present state of the SDN and the potential state of the SDN is the increase in the availability of ports. Similarly, other values indicative of the present state of the SDN may be compared with corresponding values indicative of the potential state of the SDN. For example, the number of hosts in the present state of the SDN may be compared with the number of hosts in the potential state of the SDN, the tunnel topology in the present state of the SDN may be compared with the tunnel topology in the potential state of the SDN, and the routes in the present state of the SDN may be compared with the routes in the potential state of the SDN.

In some embodiments, the differences between corresponding values of the present state of the SDN and the potential state of the SDN may be combined to generate the change index. For example, differences between corresponding values of the present state of the SDN and the potential state of the SDN may be normalized and then summed. Alternatively or additionally, in some embodiments, differences between corresponding values of the present state of the SDN and the potential state of the SDN may be scaled and/or converted. For example, changes in the tunnel topology of the SDN may not be numeric changes. For example, changing from a hub and spoke topology to a full mesh topology may not be computable as a mathematic difference between full mesh and hub and spoke. In this example, the difference may be assigned a value based on the degree of the difference between the present state value and the corresponding potential state value.

In at least some embodiments, some or all of the differences may be weighted. The weights may be indicative of an effect on the SDN, predefined by a network administrator, based on machine learning regarding historical changes to the SDN and the associated effect of the changes, determined based on characteristics of the SDN, etc. For example, in some embodiments, particular values may be considered more indicative of changes to the SDN than other values and thus those particular values may be associated with a higher weight as compared to the other values. In these and other embodiments, differences in routing between the present state of the SDN and the potential state of the SDN may be given greater weight than differences in the number of hosts between the present state and the potential state. In some embodiments, changes to Internet access may have a significant impact on the functioning of the network. In these and other embodiments, proposed changes that affect Internet access may be given greater weight than other changes. Alternatively or additionally, in some embodiments, changes to particular nodes may be given greater weight than changes to other nodes. For example, in some embodiments, a particular node may be a site that is accessed by several other nodes. In these and other embodiments, proposed changes that affect the particular node may be given greater weight and may increase the change index.

Additionally or alternatively, in some embodiments, the control device 120 may compare historical data of the current state of the SDN with the potential state of the SDN. For example, in these and other embodiments, the proposed changes may impact applications which are used by the edge network devices 110 of the SDN. For example, in some embodiments, the proposed changes may affect traffic flow related to a social media application, which may be considered a low priority application. Alternatively or additionally, in some embodiments, the proposed changes may affect traffic flow or accessibility of a productivity application, which may be considered a high priority application. The control device 120 may determine which types of applications are affected by the proposed changes to the SDN. In these and other embodiments, the change index may include differences between historical data of the SDN and the potential state of the SDN.

In some embodiments, the control device 120 may be configured to determine the potential state of the SDN based on the proposed changes to the SDN using modeling. In some embodiments, the control device 120 may generate a model including the effects of implementing the one or more proposed changes in the SDN. In these and other embodiments, the determination of the model and the values indicative of the potential state of the SDN may involve the use of a sandbox. The sandbox may be a software-defined testing environment that mirrors or matches the SDN and allows the proposed changes to be made in the testing environment without affecting the SDN. The sandbox may be used to determine how the proposed configuration of the SDN may be processed by devices of the SDN without impacting the functioning of the SDN.

For example, the control device 120 may apply machine learning algorithms to the monitored data and the proposed changes in order to satisfy use-cases of network planning (e.g., forecasting), network operations (e.g., SLA policy recommendation, carrier selection), what-if analysis, and network security (anomaly detection). In some embodiments, the control device 120 may, for example, use the monitor data to and the proposed changes to provide a forecast of future bandwidth for apps and/or sites based on the monitor data (e.g., past usage) and the proposed changes. In some embodiments, the control device 120 may use the monitor data and the proposed changes for carrier selection. For example, the control device 120 may determine performance of one or more carriers (e.g., Comcast, AT&T, Verizon) to determine characteristics of the potential state of the SDN based on the proposed changes.

The control device 120 may also be used to generate a potential state of the SDN for "what-if" analysis. The "what if" analysis may be used to predict effects on the system 100 in response to proposed changes that may be made to the system 100. For example, a "what-if" data model may be used to predict how bandwidth needs may change in various scenarios in response to a proposed change, such as adding new users to existing sites, adding new applications to existing sites, new sites are up with users and/or applications, etc. The potential state of the SDN may also be used to provide an analysis on how SLA characteristics may change when some or all traffic is moved from a first tunnel to a second tunnel.

In some embodiments, the control device 120 may take a variety of actions based on the change index. For example, in some embodiments, the control device 120 may be provide the change index to a user via the interface. In some embodiments, the interface may include a graphical user interface presented on a display of an electronic device. For example, in these and other embodiments, the change index may be displayed on an electronic display. Alternatively or additionally, in some embodiments, the interface may include a software interface or a hardware interface. For example, in some embodiments, the control device 120 may provide the change index to the user via a network interface. In these and other embodiments, the change index may be a single number. For example, in some embodiments, the change index may be a number between 1 and 10 on a logarithmic scale. In these and other embodiments, a difference of 1 between two change indices may present a 10× difference between the proposed changes associated with each of the change indices. Alternatively or additionally, in some embodiments, the change index may include a different range or a different scaling. In some embodiments, the control device 120 may present the change index as a verbal description associated with the value of the change index. For example, in these and other embodiments, the control device 120 may present the change index as "low risk," "medium risk," "high risk," and "very high risk." Alternatively or additionally, in some embodiments, the control device 120 may present the change index as a combination of a numeric value and a verbal description.

In some embodiments, the control device 120 may additionally present the values that are components of the change index. For example, the control device 120 may present the values which contributed to the magnitude of the change index. For example, the control device 120 may identify that changes to the tunnel configuration of the SDN resulted in a greater magnitude of the change index. Additionally or alternatively, the control device 120 may present a depiction of what functionality of the SDN changes in response to the proposed changes. In these and other embodiments, the control device 120 may present the user with a description of what effects the proposed changes may have on different aspects of the SDN.

In some embodiments, the control device 120 may present a warning that the change index exceeds a change threshold in response to the change index exceeding the change threshold. In these and other embodiments, the control device 120 may present the change index and details concerning the change index via the interface, as discussed above. In some embodiments, in response to receiving an authorization from an administrator account to override the warning, the control device 120 may allow the proposed changes to be implemented in the SDN.

In some embodiments, the control device 120 may prevent an administrator of the SDN from implementing the proposed changes based on the administrator's account permission level and/or the magnitude of the change index. For example, in some embodiments, different administrator accounts may be associated with different permission levels. In these and other embodiments, administrator accounts with a lower permission level may not be able to implement changes while administrator accounts with a higher permission level may be able to implement changes. Alternatively or additionally, in some embodiments, the control device 120 may associate the ability to implement changes with the magnitude of the change index. In these and other embodiments, an administrator of the SDN may be able to authorize implementation of the proposed changes using a device in response to the change index being below a change threshold. The administrator may not be able to authorize implementation of the proposed changes in response to the change index being above the change threshold.

Alternatively or additionally, in some embodiments, the control device 120 may base the implementation of the proposed changes on both the permission level of an administrator's account and on the change index. For example, in some embodiments, the control device 120 may scale the change index from 1 to 10. In these and other embodiments, the control device 120 may associate a first administrator account with a change threshold of 7. In these and other embodiments, the first administrator may have permission to authorize implementation of proposed changes when the proposed changes have a change index less than or equal to the change threshold of 7. In these and other embodiments, when the proposed changes have a change index that exceeds the change threshold of 7, that is a change index of 8, 9, or 10, the control device 120 may prevent the first administrator from authorizing the implementation of the proposed changes. The control device 120 may grant a second administrator account permission to authorize the implementation of the proposed changes regardless of the change index. The second administrator may provide an authorization to implement the proposed changes via the interface. In response to receiving the authorization from an administrator account associated with a permission level greater than or equal to the change index, the control device 120 may allow the proposed changes to be implemented in the SDN.

In some embodiments, the control device 120 may associate multiple permission levels with administrator accounts. For example, in some embodiments, a first permission level may be associated with a first change threshold. Administrator accounts with the first permission level may implement proposed changes with change indices less than or equal to the first change threshold. A second permission level may be associated with a second change threshold. Administrator accounts with the second permission level may implement proposed changes with change indices less than or equal to the second change threshold. A third permission level may be associated with a third change threshold. Alternatively or additionally, there may a greater or lesser number of permission levels associated with change thresholds.

The control device 120 may generate policies based on the one or more proposed changes. A policy may include a rule or set of rules bearing on the handling of network traffic, such as routing, priority, media, etc. For example, the traffic flow for one application may be sent via a particular communication link so that the traffic flow may comply with a corresponding SLA. For example, one or more of the proposed changes may be associated with a policy regarding directing network traffic onto various links. Alternatively or additionally, in some embodiments, the proposed changes may be associated with policies regarding data traffic routes through the internal network domain 105. For example, in some embodiments, the proposed changes may be associated with a policy change from routing traffic through a most direct route to routing traffic through a most cost effective route. The control device 120 may generate updated policies based on the proposed changes.

The control device 120 may distribute the proposed changes and/or the updated policies associated with the one or more proposed changes to one or more of the edge network devices 110. In some embodiments, the control device 120 may distribute the proposed changes and/or the updated policies based on receiving an approval of the proposed changes. For example, in these and other embodiments, the control device 120 may present the change index via an interface together with an option to approve the proposed changes. In response to receiving the approval of the proposed changes via the interface, the control device 120 may distribute the proposed changes and/or the updated policies to the edge network devices 110. In some embodiments, a network administrator account may have authority to approve a proposed change based on the change index associated with the proposed changes, as discussed above. In response to receiving a denial of approval of the proposed changes via the interface, the control device 120 may refrain from distributing the proposed changes and/or the updated policies to the edge network devices 110. In some embodiments, the control device 120 may generate the updated policies after receiving approval of the proposed changes.

Modifications, additions, or omissions may be made to FIG. 1 without departing from the scope of the present disclosure. For example, while illustrated as including four edge network devices 110 and one control device 120, the system 100 may include any number of edge network devices 110 and control devices 120, such as thousands or tens of thousands of edge network devices 110 and more than five control devices 120. As another example, as illustrated as a single communication network 130, the communication network 130 may include multiple types of communication connections.

Figure 2:
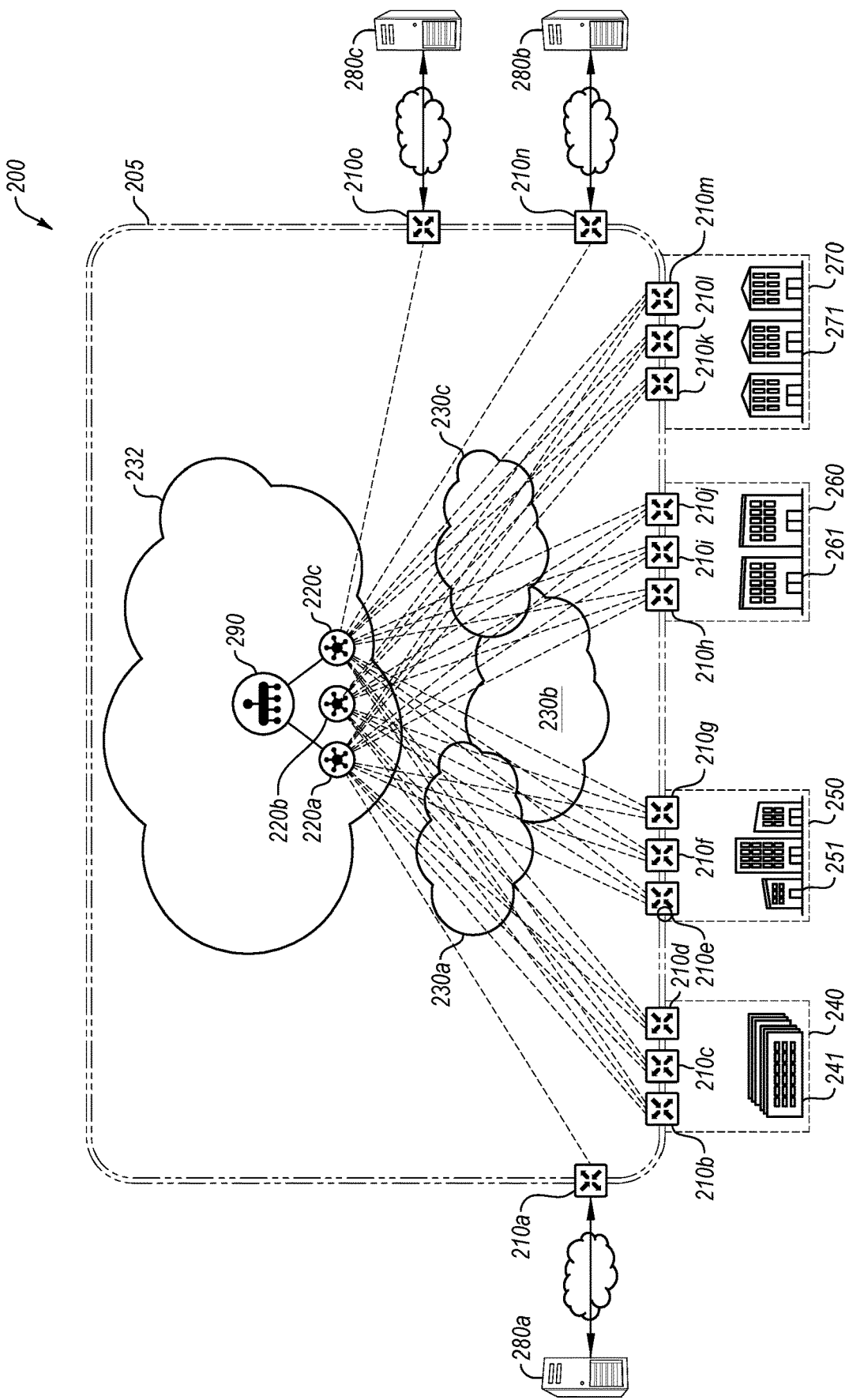
FIG. 2 illustrates another example system implementing a SDN.

FIG. 2 illustrates another example system 200 of network components implementing a SDN, in accordance with one or more embodiments of the present disclosure. The system 200 may include one or more edge network devices 210 (such as edge network devices 210a-210o), one or more control devices 220 (such as control devices 220a, 220b, and 220c), and one or more communication networks 230 (such as communication networks 230a, 230b, and 230c). The edge network devices 210 may be similar or comparable to the edge network devices 110 of FIG. 1, the control devices 220 may be similar or comparable to the control device 120 of FIG. 1, and the communication networks 230 may be similar or comparable to the communication network 130 of FIG. 1. The system 200 may be a similar or comparable system to the system 100 of FIG. 1, although expanded to include additional network components and additional external network domains.

The system 200 may include an internal network domain 205 in and between the edge network devices 210, in a similar or comparable manner to that described with respect to the system 100 of FIG. 1. The system 200 additionally may include multiple external network domains. For example, a data center 240 may represent a first external network domain, a campus 250 may represent a second external network domain, a branch 260 may represent a third external network domain, and a remote site 270 may represent a fourth external network domain. In these and other embodiments, each external network domain may include one or more edge network devices 210 acting as a bridge between the internal network domain 205 and the given external network domain. Additionally or alternatively, one or more of the external network domains may functionally operate as being accessible from the other external network domains as though in a single network by being communicatively coupled through the internal network domain 205.

In some embodiments, the system 200 may include one or more external resources 280 (such as the external resources 280a-280c). The external resources 280 may be operated by the same entity or organization that operates the internal network domain 205, or may be operated by a different entity. In these and other embodiments, the system 200 may include an edge network device 210 that may be associated with a particular external resource 280. For example, the system 200 may include an edge network device 210 located within a regional co-location facility. A regional co-location facility may include a location with directed or guaranteed access to the Internet or other communication protocols at a given physical location. In some embodiments, a regional co-location facility may include a prioritized or improved connection to one or more of the external resources 280. In some embodiments, the regional co-location facility may be at a designated geographical location that may be physically proximate one or more of the external network domains. For example, the data center 240 may be located in New York, and the branch 260 may be located in Dallas Tex., and the edge network device 210n may be in a regional co-location facility in Houston, Tex.

The external resources 280 may include any computing service available for consumption by the system 200. For example, the external resources 280 may include a cloud-based service such as a software subscription or software as a service (SaaS) (such as Microsoft Office 365®, Azure®, Google Apps®, Workforce®, Amazon Web Services®, WorkDay®, DocuSign®, GoToMeeting®, WebEx®, Quick-Books®, and/or others), media services (such as YouTube®, NetFlix®, Pandora®, Spotify®, and/or others), and/or others. In these and other embodiments, the external resources 280 may include a third party network to facilitate access to the external resource 280 with one or more access points at various geographical locations. For example, a SaaS may include an access server in Austin, Tex.; Palo Alto, Calif.; and New York, N.Y. for accessing the third party network.

In some embodiments, the system 200 may be geographically distributed. For example, the data center 240 may be located in St. Paul, Minn.; the campus 250 may be located in Des Moines, Iowa; there may be branches 260 in Seattle, Wash.; Los Angeles, Calif.; Atlanta, Ga.; and Orlando, Fla.; and there may be remote sites 270 in London, England; Berlin, Germany; and Seoul, Korea. In these and other embodiments, the system 200 may use the communication networks 230 and the internal network domain 205 to facilitate communication between all of these distributed physical locations as a single network.

In some embodiments, one or more of the external network domains may use one or more applications with resources in the data center 240, such as Microsoft Exchange®, SharePoint®, Oracle e-Business Suite®, and/or others. For example, a workstation operating at the campus 250 may operate Microsoft Exchange®. The operation of the application may include a data flow that goes from the workstation to the edge network device 210e in the external network domain of the campus 250. The data flow may go from the edge network device 210e to one of the edge network devices 210b, 210c, and/or 210d associated with the data center 240 through the internal network domain 205. The one of the edge network devices 210b, 210c, and/or 210d may route the traffic to the Microsoft Exchange® server in the external network domain of the data center 240. Additionally or alternatively, the operation of the application may include a data flow in the reverse order of data flowing from the Microsoft Exchange® server to the workstation.

In some embodiments, the system 200 may include a network management device 290 that may communicate with the control devices 220 over a management network 232. The network management device 290 may provide management and control of one or more devices associated with the internal network domain 205, including the edge network devices 210, the control devices 220, and/or others. For example, the network management device 290 may provide a graphical user interface (GUI) that provides a network administrator with access to control or observe operation of the internal network domain 205. In some embodiments, the network administrator may input policies via the network management device 290 that may be communicated to the control devices 220 for implementation via the edge network devices 210. In some embodiments, the network administrator may input proposed changes via the network management device 290. In some embodiments, the network management device 290 may communicate the proposed changes to the control devices 220 for implementation via the edge network devices 210. Alternatively or additionally, in some embodiments, the network management device 290 may generate updated policies based on the proposed changes and may communicate the updated policies to the control devices 220 for implementation via the edge network devices 210. In some embodiments, the network management device 290 may provide a GUI dashboard with a visual and/or textual description of one or more properties of the internal network domain 205, such as a number and/or status and/or health of edge network devices 210, a number and/or status of control devices 220, a number of and/or last time of reboot, transport health (such as loss, latency, and/or jitter), a number of sites that are operating or not operating, application consumption of network resources, application routing, and/or others. In some embodiments, the network administrator may input proposed changes to the network via the interface. In some embodiments, the network management device 290 may provide a display via the interface with a visual and/or textual description of the change index and details concerning the differences between the present state of the network and the proposed state of the network.

In some embodiments, the network management device 290 may be configured to recognize approved edge network devices 210 and/or control device 220. For example, the network management device 290 may maintain a list of serial numbers, MAC addresses, or other uniquely identifying information for the edge network devices 210 and/or the control devices 220. In these and other embodiments, communication in the internal network domain 205 may be restricted to edge network devices 210 and/or control devices 220 with identifying information on the list maintained by the network management device 290.

In some embodiments, the network management device 290 may be configured to generate and/or store configurations of one or more edge network devices 210 and/or control devices 220. For example, a network administrator may use the network management device 290 to configure a particular edge network device 210 and may store that configuration as a template that may be applied to future edge network devices. Additionally or alternatively, a template for the edge network devices 210 may be provided by a third party and applied to a new edge network device 210. In these and other embodiments, a template for the control devices 220 may be generated, stored, and/or applied to a new control device 220. Additionally or alternatively, such a template may be used to automatically configure a newly deployed edge network device 210. For example, the newly deployed edge network device 210 may be brought online and connected to a corresponding control device 220. The corresponding control device 220 may verify the serial number of the edge network device 210 with the network management device 290, and may obtain a template from the network management device 290 for the edge network device 210. The control device 220 may send the template to the edge network device 210 to be automatically installed to configure the edge network device 210 according to the template.

In at least some embodiments, the network management device 290 may be configured to manage data collection activities at various components of the SDN. For example, the network management device 290 may direct one or more of the edge network devices 110 to monitor various characteristics of the SDN, such as performance, SLA, security, etc. in a system with multiple control devices 220. In some embodiments, the data collection may include historical data related to applications used by edge network devices 210. For example, in these and other embodiments, the network management device 290 may direct one or more devices to monitor which applications are used most by edge network devices 210.

The network management device 290 may use one or more control messages to direct the data collection activities at the various components of the SDN. For example, the network management device 290 may generate a set of instructions for a set of devices in the SDN to monitor a set of characteristics. The network management device 290 may send the set of instructions as a control message to the set of devices in the SDN via the control plane. In at least some embodiments, the network management device 290 sends the control message to the control devices 220 and the control devices 220 may distribute the control message to devices that are connect to the respective control device 220.

Following the set of instructions in the control message, the set of devices in the SDN may collect the monitor data. The devices in the system may send the monitor data securely over a data-bus (e.g., the control plane) in real-time to the network management device 290, such as directly to the network management device 290 or indirectly, such as via the control devices 220. As an example, with QoS monitoring of communication links, the edge network devices 110 may provide for one or more QoS metrics that may be monitored for any communication link, such as jitter, bandwidth, error rate, bit rate, throughput, and/or others. In some embodiments, the monitor data may include route data, port ranges, a number of transport links per device, a number of network connections per device, a tunnel configuration or topology of the SDN, a number of hosts of the SDN, applications used over the SDN, autonomous systems associated with the SDN, a number of nodes in the SDN, a number of reachable destinations in the SDN, a number of WAN interfaces per node, a number of LAN interfaces per node, bandwidth, and other values indicative of the present state of the SDN. The various components of the SDN may send monitored data to the network management device 290 via the control plane.

The network management device 290 may also generate data for a potential state of the SDN based on the proposed changes to the SDN. For example, the network management device 290 may determine route data, port ranges, a number of transport links per device, a number of network connections per device, a tunnel configuration or topology of the potential state of the SDN, a number of hosts of the potential state of the SDN, autonomous systems associated with the potential state of the SDN, a number of nodes in the SDN, a number of reachable destinations in the SDN, a number of WAN interfaces per node, a number of LAN interfaces per node, bandwidth, and other values indicative of the potential state of the SDN.

The network management device 290 may generate a change index based at least in part on the monitor data collected from the various components of the SDN and based on the proposed changes. For example, in some embodiments, the network management device 290 may compare route data in the present state of the SDN with route data in the potential state of the SDN. Alternatively or additionally, the network management device 290 may also determine the change index based on historical data related to the network. In some embodiments, the network management device 290 may obtain the monitor data and/or the historical data from the control devices 220. In these and other embodiments, each of the control devices 220 may be configured to obtain values associated with the present state of the SDN and may provide the values to the network management device 290. Alternatively or additionally, each of the control devices 220 may be configured to obtain historical data associated with the SDN and may provide the historical data to the network management device 290.

In some embodiments, the network management device 290 may generate a model of the proposed changes to the SDN together with the control devices 220. In these and other embodiments, the network management device 290 may determine a potential state of the SDN based on the proposed changes to each of the control devices 220. In some embodiments, proposed changes to one control device 220, such as the control device 220a, may not have an effect on other control devices 220, such as the control devices 220b and 220c. Alternatively or additionally, in some embodiments, proposed changes to one control device 220 may have an effect on other control devices 220. For example, the network management device 290 may apply machine learning algorithms to the monitored data in order to satisfy use-cases of network planning (e.g., forecasting), network operations (e.g., SLA policy recommendation, carrier selection), what-if analysis, and network security (anomaly detection). Based on the proposed changes, the network management device 290 may generate a policy to affect various changes in the SDN. The network management device 290 may distribute the policies to one or more of the edge network devices 110. Alternatively or additionally, in some embodiments, the network management device 290 may distribute the proposed changes to one or more of the edge network devices 110.

In at least some embodiments, the control devices 220 may generate and communicate control messages and/or policies independently of the network management device 290 and the other control devices 220, such as is described in conjunction with FIG. 1.

In some embodiments, the network management device 290 may be implemented as a physical device or a virtualized machine. In these and other embodiments, the network management device 290 may be physically located proximate a centralized location, such as within the data center 240 or at the campus 250.

Modifications, additions, or omissions may be made to FIG. 2 without departing from the scope of the present disclosure. For example, while illustrated as including a certain number of edge network devices 210 and external network domains, the system 200 may include any number of edge network devices 210 and external network domains.

Figure 3:
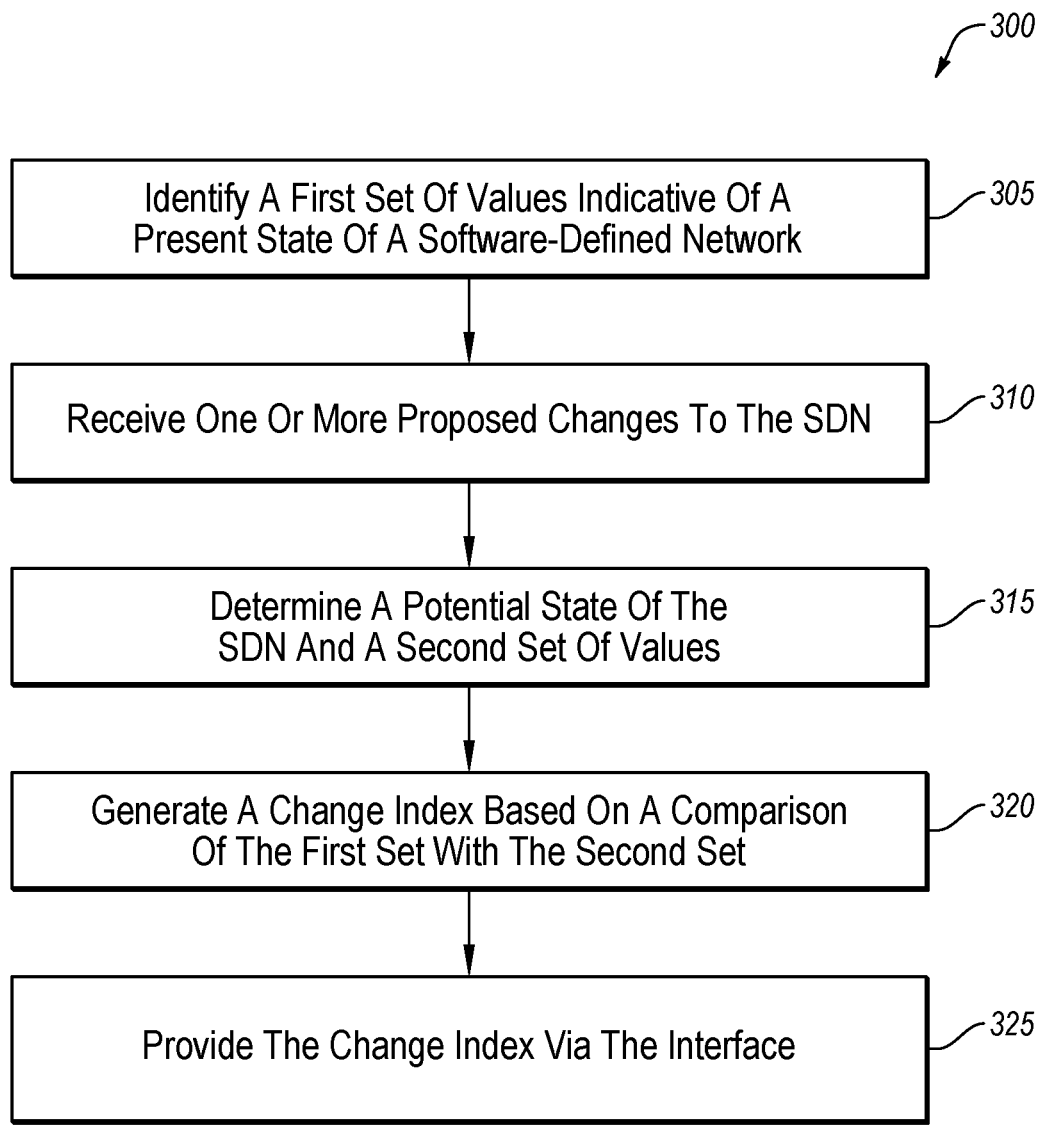
FIG. 3 illustrates a flowchart of an example method to analyze a proposed change in a SDN.

FIG. 3 illustrates a flowchart of an example method 300 of analyzing proposed changes with respect to a SDN, in accordance with one or more embodiments of the present disclosure. The method may be performed by processing logic that may include hardware (circuitry, dedicated logic, etc.), software (such as is run on a general purpose computer system or a dedicated machine), or a combination of both, which processing logic may be included in the any of the network devices (e.g., the control devices 120 and 220 of FIGS. 1 and 2, and/or the network management device 290 of FIG. 2), or another computer system or device. However, another system, or combination of systems, may be used to perform the methods. For simplicity of explanation, methods described herein are depicted and described as a series of acts. However, acts in accordance with this disclosure may occur in various orders and/or concurrently, and with other acts not presented and described herein. Further, not all illustrated acts may be used to implement the methods in accordance with the disclosed subject matter. In addition, those skilled in the art will understand and appreciate that the methods may alternatively be represented as a series of interrelated states via a state diagram or events. Additionally, the methods disclosed in this specification are capable of being stored on an article of manufacture, such as a non-transitory computer-readable medium, to facilitate transporting and transferring such methods to computing devices. The term article of manufacture, as used herein, is intended to encompass a computer program accessible from any computer-readable device or storage media. Although illustrated as discrete blocks, various blocks may be divided into additional blocks, combined into fewer blocks, or eliminated, depending on the desired implementation.

FIG. 3 illustrates a flowchart of an example method 300 to monitor a set of characteristics in a SDN. The method 300 may begin at block 305, where the processing logic may identify a first set of values indicative of a present state of a software-defined network (SDN). The SDN may include a centralized control plane isolated from a data plane. The SDN may include any type or location of devices, such as one or more edge network devices 110 (such as the edge network devices 110a-110d), a control device 120, a communication network 130, and external network devices 140 and 141 (such as the external network devices 140a-140d and 141a-141d), described in more detail in conjunction with FIG. 1 or any other device or connection described in conjunction with FIG. 2. In at least some embodiments, the first set of values may include one or more of a number of routes, a port range, a number of transport links or connections per device, a tunnel configuration, and a number of impacted nodes for the present state of the SDN.

At block 310, the processing logic may receive one or more proposed changes to the SDN. The processing logic may receive the one or more proposed changes via an interface. For example, an administrator of the SDN may enter the proposed changes using a keyboard into the interface. For example, the proposed changes to the SDN may include alterations to a white-list associated with sites or resources determine to be safe for accessing via the SDN. Alternatively or additionally, the proposed changes may include additional lines of code to be added to the source code of one or more network resources associated with the SDN.

At block 315, the processing logic may determine a potential state of the SDN based on the one or more proposed changes to the SDN. The processing logic may also determine a second set of values indicative of the potential state of the SDN. In at least some embodiments, the second set of values may include one or more of a number of routes, a port range, a number of transport links or connections per device, a tunnel configuration, and a number of impacted nodes for the potential state of the SDN.

At block 320, the processing logic may generate a change index based on a comparison of the first set of values with the second set of values. In at least some embodiments, generating the change index may include identifying a weight for one or more value of the first set of values. In some embodiments, the weight may correspond with a relative importance of the respective value of the first set of values. In some embodiments, the weights may be provided by an administrator of the SDN. For example, the administrator may assign a weight to each of the values based on factors related to the SDN. The administrator may determine that a particular value is probative of the magnitude of a change made to the SDN and may assign the particular value a higher weight. For example, the weight of a particular value may be 2 while each weight for each other value may be 1. In at least some embodiments, generating the change index may also include determining a difference between each value of the first set of values and a corresponding value of the second set of values. For example, the first value for the number of connections in the present state of the SDN may be 10. The corresponding value of the second set of values for the number of connections in the potential state of the SDN may be 20. The difference between the two values may be 10. In at least some embodiments, generating the change index may also include generating a change magnitude based on the weight and the difference. For example, continuing the above example, the change index may be the product of the weight and the difference, 0.2×10=5. In at least some embodiments, generating the change index may also include combining the change magnitudes for each of the values of the first set of values. For example, the change magnitudes may sum to 8.

At block 325, the processing logic may provide the change index via the interface. In some embodiments, the change index may be presented on a display for viewing by an administrator of the SDN. In these and other embodiments, the change index may be presented as a single number. For example, in some embodiments, the change index may be a number between 1 and 10 on a logarithmic scale. In these and other embodiments, a difference of 1 between two change indices may represent an order of magnitude difference between the proposed changes associated with each of the change indices. In some embodiments, the change index may be presented in bands. For example, in these and other embodiments, a change index between 0 and 3 may be presented as a low risk change, a change index between 3 and 6 may be presented as a medium risk change, a change index between 6 and 9 may be presented as a high risk change, and a change index between 9 and 10 may be presented as a very high risk change. In some embodiments, change indices between 9 and 10 may be prevented from being implemented in the SDN.

In some embodiments, the change index may be presented on the display together with details concerning the proposed changes. For example, in some embodiments, a user may be able to view what functionality of the SDN changes in response to the proposed changes. For example, the values associated with the present state of the SDN and the values associated with the potential state of the SDN may be presented to the user. In some embodiments, the differences between values of the present state of the SDN and the associated values of the potential state of the SDN may be presented in bands similar to the change index. For example, in these and other embodiments, the difference between the numbers of routes may be categorized as a low risk, medium risk, or high risk difference. Similarly, differences between other values may be presented in categories associated with risk.

One skilled in the art will appreciate that, for these processes, operations, and methods, the functions and/or operations performed may be implemented in differing order. Further, the outlined functions and operations are only provided as examples, and some of the functions and operations may be optional, combined into fewer functions and operations, or expanded into additional functions and operations without detracting from the essence of the disclosed embodiments.

For example, in some embodiments, the method 300 may further include identifying a first change threshold associated with a first permission level of a first administrator account. The first administrator account may be associated with the one or more proposed changes. In response to the change index not exceeding the first change threshold, the one or more proposed changes may be allowed to be implemented in the SDN. In response to the change index exceeding the first change threshold, the one or more proposed changes may be prevented from being implemented in the SDN. Additionally or alternatively, in some embodiments, the method 300 may further include receiving an authorization to implement the proposed changes in the SDN via the interface from a second administrator account with a second permission level. In these and other embodiments, the method 300 may also include identifying a second change threshold associated with the second permission level of the second administrator account. The second administrator may be associated with the authorization. The method 300 may further include allowing the one or more proposed changes to be implemented in the SDN in response to the change index not exceeding the second change threshold.

Alternatively or additionally, in some embodiments, the method 300 may also include identifying a third set of values for the SDN. The third set of values may include historical data of the SDN. In these and other embodiments, the change index may be further generated based on a comparison of the third set of values with the second set of values. In at least some embodiments, the third set of values may include a number of hosts, a number of autonomous systems, and a category of applications.

Figure 4:
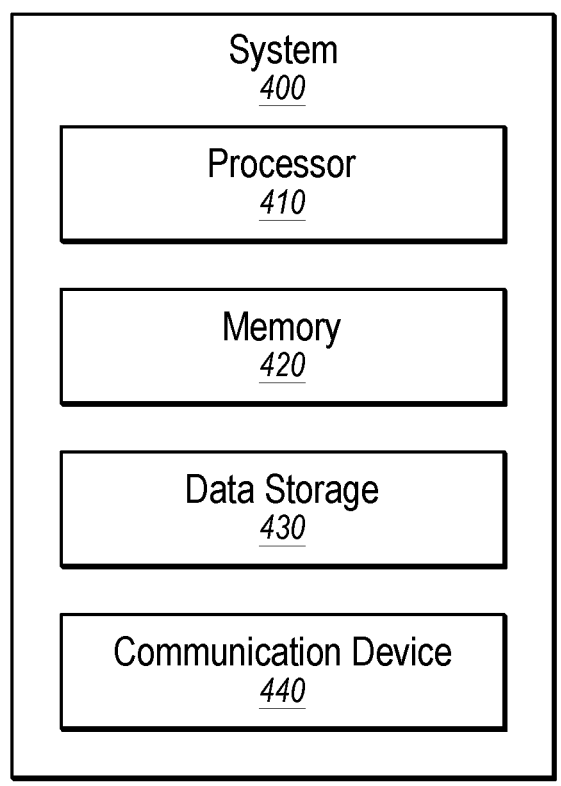
FIG. 4 illustrates an example computing system.

FIG. 4 illustrates an example computing system 400, according to at least one embodiment described in the present disclosure. The system 400 may include any suitable system, apparatus, or device configured to test software. The computing system 400 may include a processor 410, a memory 420, a data storage 430, and a communication unit 440, which all may be communicatively coupled. In some embodiments, any of the network devices (e.g., the edge network devices 110 or 210 of FIGS. 1-2), control devices (e.g., the control devices 120 or 220 of FIGS. 1-2), local computing devices, network management devices (e.g., the network management device 290 of FIG. 2) or other computing devices of the present disclosure may be implemented as the computing system 400. Additionally or alternatively, one or more of the network devices, control devices, local computing devices or other computing devices may be implemented as virtualized machines operating on a physical computing system such as the computing system 400.

Generally, the processor 410 may include any suitable special-purpose or general-purpose computer, computing entity, or processing device including various computer hardware or software modules and may be configured to execute instructions stored on any applicable computer-readable storage media. For example, the processor 410 may include a microprocessor, a microcontroller, a digital signal processor (DSP), an application-specific integrated circuit (ASIC), a Field-Programmable Gate Array (FPGA), or any other digital or analog circuitry configured to interpret and/or to execute program instructions and/or to process data.

Although illustrated as a single processor in FIG. 4, it is understood that the processor 410 may include any number of processors distributed across any number of network or physical locations that are configured to perform individually or collectively any number of operations described in the present disclosure. In some embodiments, the processor 410 may interpret and/or execute program instructions and/or process data stored in the memory 420, the data storage 430, or the memory 420 and the data storage 430. In some embodiments, the processor 410 may fetch program instructions from the data storage 430 and load the program instructions into the memory 420.

After the program instructions are loaded into the memory 420, the processor 410 may execute the program instructions, such as instructions to perform the methods 300 of FIG. 3. For example, the processor 410 may identify a first set of values indicative of a present state of a software-defined network, determine a second set of values indicative of a potential state of the SDN, and generate a change index based on a comparison of the first set of values with the second set of values. As another example, the processor 410 may determine a potential state of the SDN based on one or more proposed changes to the SDN. As an additional example, the processor 410 may prevent the proposed changes to the SDN from being implemented based on the change index exceeding a change threshold associated with a permission level of an administrator account associated with the proposed changes. As an additional example, the processor 410 may allow the proposed changes to be implemented in the SDN in response to the change index not exceeding the change threshold.

The memory 420 and the data storage 430 may include computer-readable storage media or one or more computer-readable storage mediums for carrying or having computer-executable instructions or data structures stored thereon. Such computer-readable storage media may be any available media that may be accessed by a general-purpose or special-purpose computer, such as the processor 410. In some embodiments, the computing system 400 may or may not include either of the memory 420 and the data storage 430.

By way of example, and not limitation, such computer-readable storage media may include non-transitory computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage medium which may be used to carry or store desired program code in the form of computer-executable instructions or data structures and which may be accessed by a general-purpose or special-purpose computer. Combinations of the above may also be included within the scope of computer-readable storage media. Computer-executable instructions may include, for example, instructions and data configured to cause the processor 410 to perform a certain operation or group of operations.

The communication unit 440 may include any component, device, system, or combination thereof that is configured to transmit or receive information over a network, such as an MPLS connection, the Internet, a cellular network (e.g., an LTE network), etc. In some embodiments, the communication unit 440 may communicate with other devices at other locations, the same location, or even other components within the same system. For example, the communication unit 440 may include a modem, a network card (wireless or wired), an optical communication device, an infrared communication device, a wireless communication device (such as an antenna), a chipset (such as a Bluetooth device, an 802.6 device (e.g., Metropolitan Area Network (MAN)), a WiFi device, a WiMax device, cellular communication facilities, or others), and/or the like, or any combinations thereof. The communication unit 440 may permit data to be exchanged with a network and/or any other devices or systems described in the present disclosure. For example, the communication unit 440 may allow the system 400 to communicate with other systems, such as network devices, control devices, and/or other networks.

Modifications, additions, or omissions may be made to the system 400 without departing from the scope of the present disclosure. For example, the data storage 430 may be multiple different storage mediums located in multiple locations and accessed by the processor 410 through a network.

As indicated above, the embodiments described in the present disclosure may include the use of a special purpose or general purpose computer (e.g., the processor 410 of FIG. 4) including various computer hardware or software modules, as discussed in greater detail below. Further, as indicated above, embodiments described in the present disclosure may be implemented using computer-readable media (e.g., the memory 420 or data storage 430 of FIG. 4) for carrying or having computer-executable instructions or data structures stored thereon.

As used in the present disclosure, the terms "module" or "component" may refer to specific hardware implementations configured to perform the actions of the module or component and/or software objects or software routines that may be stored on and/or executed by general purpose hardware (e.g., computer-readable media, processing devices, or some other hardware) of the computing system. In some embodiments, the different components, modules, engines, and services described in the present disclosure may be implemented as objects or processes that execute on the computing system (e.g., as separate threads). While some of the systems and methods described in the present disclosure are generally described as being implemented in software (stored on and/or executed by general purpose hardware), specific hardware implementations or a combination of software and specific hardware implementations are also possible and contemplated. In this description, a "computing entity" may be any computing system as previously defined in the present disclosure, or any module or combination of modulates running on a computing system.

In accordance with common practice, the various features illustrated in the drawings may not be drawn to scale. The illustrations presented in the present disclosure are not meant to be actual views of any particular apparatus (e.g., device, system, etc.) or method, but are merely idealized representations that are employed to describe various embodiments of the disclosure. Accordingly, the dimensions of the various features may be arbitrarily expanded or reduced for clarity. In addition, some of the drawings may be simplified for clarity. Thus, the drawings may not depict all of the components of a given apparatus (e.g., device) or all operations of a particular method.

Terms used in the present disclosure and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," among others).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

Additionally, the use of the terms "first," "second," "third," etc., are not necessarily used herein to connote a specific order or number of elements. Generally, the terms "first," "second," "third," etc., are used to distinguish between different elements as generic identifiers. Absence a showing that the terms "first," "second," "third," etc., connote a specific order, these terms should not be understood to connote a specific order. Furthermore, absence a showing that the terms "first," "second," "third," etc., connote a specific number of elements, these terms should not be understood to connote a specific number of elements. For example, a first widget may be described as having a first side and a second widget may be described as having a second side. The use of the term "second side" with respect to the second widget may be to distinguish such side of the second widget from the "first side" of the first widget and not to connote that the second widget has two sides.

All examples and conditional language recited in the present disclosure are intended for pedagogical objects to aid the reader in understanding the invention and the concepts contributed by the inventor to furthering the art, and are to be construed as being without limitation to such specifically recited examples and conditions. Although embodiments of the present disclosure have been described in detail, it should be understood that the various changes, substitutions, and alterations could be made hereto without departing from the spirit and scope of the present disclosure.

What is claimed is:

1. A method, comprising:
    obtaining, by a control device, a first set of values indicative of a present state of a software-defined network (SDN), the present state comprising a current configuration of the SDN;
    receiving one or more proposed changes to the SDN via an interface of the SDN;
    generating a model of the SDN that reflects the SDN with the one or more proposed changes and one or more effects of the one or more proposed changes to the SDN, the model of the SDN being generated without applying the one or more proposed changes to the SDN;
    determining, based on the model, a potential state of the SDN and a second set of values indicative of the potential state of the SDN, the potential state comprising a new configuration of the SDN reflecting the one or more proposed changes to the SDN;
    determining differences between the first set of values indicative of the present state of the SDN and the second set of values indicative of the potential state of the SDN;
    combining the differences between the first set of values indicative of the present state of the SDN and the second set of values indicative of the potential state of the SDN;
    generating a change index comprising one or more change values corresponding to the combined differences between the first set of values indicative of the present state of the SDN and the second set of values indicative of the potential state of the SDN, the change index indicating a magnitude of the one or more proposed changes; and
    providing the change index via the interface.

2. The method of claim 1, further comprising:
    identifying a change threshold associated with a permission level of an administrator account associated with the one or more proposed changes; and
    based on the change index not exceeding the change threshold, implementing the one or more proposed changes in the SDN.

3. The method of claim 1, wherein generating the model of the SDN comprises implementing the one or more proposed changes in a separate testing SDN that mirrors or matches the SDN, wherein the one or more proposed changes implemented in the separate testing SDN indicate effects of the one or more proposed changes to the SDN without impacting a functioning of the SDN.

4. The method of claim 1, further comprising:
    identifying a first change threshold associated with a first permission level of a first administrator account, the first administrator account being associated with the one or more proposed changes; and
    based on the change index exceeding the first change threshold, preventing the one or more proposed changes from being implemented in the SDN.

5. The method of claim 4, further comprising:
    receiving an authorization to implement the proposed changes in the SDN via the interface from a second administrator account with a second permission level;

identifying a second change threshold associated with a second permission level of the second administrator account, the second administrator being associated with the authorization; and based on the change index not exceeding the second change threshold, implementing the one or more proposed changes in the SDN.

6. The method of claim 1, further comprising identifying a third set of values for the SDN, the third set of values including historical data of the SDN, wherein the change index is further generated based on a comparison of the third set of values with the second set of values, wherein the third set of values includes one or more of: a number of hosts in the SDN, a number of autonomous systems in the SDN, and a category of applications in the SDN.

7. The method of claim 1, wherein the first set of values indicative of the present state of the SDN and the second set of values indicative of the potential state of the SDN include one or more of: a number of network routes configured in the SDN, a range of ports configured in the SDN for routing traffic, a configuration of one or more network tunnels configured in the SDN, a number of hosts on the SDN, a number of autonomous systems associated with the SDN, and a number of reachable destinations in the SDN.

8. The method of claim 1, wherein generating the change index comprises:
for each value of the first set of values:
identifying a weight for the value;
determining a difference between the value and a corresponding value of the second set of values;
based on the weight and the difference between the value and the corresponding value, generating a change magnitude; and
combining the change magnitude for each value of the first set of values to generate the change index.

9. A non-transitory computer-readable medium having stored thereon computer-readable instructions which, when executed by one or more processors, cause the one or more processors to:
obtain a first set of values indicative of a present state of a software-defined network (SDN);
receive one or more proposed changes to the SDN via an interface of the SDN;
generate a model of the SDN that reflects the SDN with the one or more proposed changes and one or more effects of the one or more proposed changes to the SDN, the model of the SDN being generated without applying the one or more proposed changes to the SDN;
determine, based on the model, a potential state of the SDN and a second set of values indicative of the potential state of the SDN;
generate a change index indicating one or more differences between the present state of the SDN and the potential state of the SDN, the change index being based on a comparison of the first set of values indicative of the present state of the SDN with the second set of values indicative of the potential state of the SDN;
provide the change index via the interface;
identify a first change threshold associated with a first permission level of a first administrator account, the first administrator account being associated with the one or more proposed changes;
based on the change index exceeding the first change threshold, prevent the one or more proposed changes from being implemented in the SDN, receive an authorization to implement the proposed changes in the SDN via the interface from a second administrator account with a second permission level;
identify a second change threshold associated with a second permission level of the second administrator account, the second administrator being associated with the authorization; and
based on the change index not exceeding the second change threshold, implement the one or more proposed changes in the SDN.

10. The non-transitory computer-readable medium of claim 9, wherein generating the model of the SDN comprises implementing the one or more proposed changes in a separate testing SDN that mirrors or matches the SDN, wherein the one or more proposed changes implemented in the separate testing SDN indicate the one or more effects of the one or more proposed changes to the SDN without impacting a functioning of the SDN.

11. The non-transitory computer-readable medium of claim 9, storing instructions which, when executed by the one or more processors, cause the one or more processors to identify a third set of values for the SDN, the third set of values including historical data of the SDN, wherein the change index is further generated based on a comparison of the third set of values with the second set of values, wherein the third set of values includes one or more of: a number of hosts in the SDN, a number of autonomous systems in the SDN, and a category of applications in the SDN.

12. The non-transitory computer-readable medium of claim 9, wherein the first set of values indicative of the present state of the SDN and the second set of values indicative of the potential state of the SDN include one or more of: a number of network routes configured in the SDN, a range of ports configured in the SDN for routing traffic, configuration of one or more network tunnels configured in the SDN, a number of hosts on the SDN, a number of autonomous systems associated with the SDN, and a number of reachable destinations in the SDN.

13. The non-transitory computer-readable medium of claim 9, wherein generating the change index comprises:
for each value of the first set of values:
identifying a weight for the value;
determining a difference between the value and a corresponding value of the second set of values;
based on the weight and the difference between the value and the corresponding value, generating a change magnitude; and
combining the change magnitude for each value of the first set of values to generate the change index.

14. A system comprising:
one or more processors; and
memory comprising instructions which, when executed by the one or more processors, cause the one or more processors to:
obtain a first set of values indicative of a present state of a software-defined network (SDN), the present state comprising a current configuration of the SDN;
receive one or more proposed changes to the SDN via an interface of the SDN;
generate a model of the SDN that reflects the SDN with the one or more proposed changes and one or more effects of the one or more proposed changes to the SDN, the model of the SDN being generated without applying the one or more proposed changes to the SDN;
determine, based on the model, a potential state of the SDN and a second set of values indicative of the potential state of the SDN, the potential state comprising a new configuration of the SDN reflecting the one or more proposed changes to the SDN;

determine differences between the first set of values indicative of the present state of the SDN and the second set of values indicative of the potential state of the SDN;

combine the differences between the first set of values indicative of the present state of the SDN and the second set of values indicative of the potential state of the SDN;

generate a change index comprising one or more change values corresponding to the combined differences between the first set of values indicative of the present state of the SDN and the second set of values indicative of the potential state of the SDN, the change index indicating a magnitude of the one or more proposed changes; and provide the change index via the interface.

15. The system of claim 14, wherein the instructions, when executed by the one or more processors, cause the one or more processors to:

identify a change threshold associated with a permission level of an administrator account associated with the one or more proposed changes; and based on the change index not exceeding the change threshold, implement the one or more proposed changes in the SDN.

16. The system of claim 14, wherein the instructions, when executed by the one or more processors, cause the one or more processors to:

identify a first change threshold associated with a first permission level of a first administrator account, the first administrator account being associated with the one or more proposed changes; and in response to the change index exceeding the first change threshold, prevent the one or more proposed changes from being implemented in the system.

17. The system of claim 14, wherein generating the model of the SDN comprises implementing the one or more proposed changes in a separate testing SDN that mirrors or matches the SDN, wherein the one or more proposed changes implemented in the separate testing SDN indicate the one or more effects of the one or more proposed changes to the SDN without impacting a functioning of the SDN.

18. The system of claim 14, wherein the instructions, when executed by the one or more processors, cause the one or more processors to identify a third set of values for the SDN, the third set of values including historical data of the SDN, wherein the change index is further generated based on a comparison of the third set of values with the second set of values, wherein the third set of values includes one or more of: a number of hosts in the SDN, a number of autonomous systems in the SDN, and a category of applications in the SDN.

19. The system of claim 14, wherein the first set of values indicative of the present state of the SDN and the second set of values indicative of the potential state of the SDN include one or more of: a number of network routes configured in the SDN, a port range of ports configured in the SDN for routing traffic, a configuration of one or more network tunnels configured in the SDN, a number of hosts on the SDN, a number of autonomous systems associated with the SDN, and a number of reachable destinations in the SDN.

20. The system of claim 14, wherein generating the change index comprises:

for each value of the first set of values:
identifying a weight for the value;
determining a difference between the value and a corresponding value of the second set of values;
based on the weight and the difference between the value and the corresponding value, generating a change magnitude; and combining the change magnitude for each value of the first set of values to generate the change index.

* * * * *